United States Patent
Gharib et al.

(10) Patent No.: US 9,834,993 B2
(45) Date of Patent: Dec. 5, 2017

(54) DRIVE SHAFT ACTUATION USING RADIO FREQUENCY IDENTIFICATION

(71) Applicant: HALLIBURTON ENERGY SERVICES, INC., Houston, TX (US)

(72) Inventors: Hossam Mohamed Gharib, Edmonton (CA); Geoffrey Andrew Samuel, Edmonton (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/129,098

(22) PCT Filed: Jun. 17, 2015

(86) PCT No.: PCT/US2015/036296
§ 371 (c)(1),
(2) Date: Sep. 26, 2016

(87) PCT Pub. No.: WO2016/204756
PCT Pub. Date: Dec. 22, 2016

(65) Prior Publication Data
US 2017/0175447 A1    Jun. 22, 2017

(51) Int. Cl.
*E21B 7/08* (2006.01)
*E21B 7/06* (2006.01)
(Continued)

(52) U.S. Cl.
CPC ............ *E21B 7/067* (2013.01); *E21B 47/122* (2013.01); *G06K 7/10425* (2013.01); *G06K 19/0723* (2013.01)

(58) Field of Classification Search
CPC ............ E21B 7/06; E21B 7/062; E21B 7/067; E21B 47/122
See application file for complete search history.

(56) References Cited

U.S. PATENT DOCUMENTS

| | | |
|---|---|---|
| 4,184,545 A | 1/1980 | Claycomb et al. |
| 5,899,281 A | 5/1999 | Gynz-Rekowski et al. |

(Continued)

FOREIGN PATENT DOCUMENTS

| | | |
|---|---|---|
| CA | 2841662 | 1/2013 |
| EP | 1245783 | 10/2002 |

(Continued)

OTHER PUBLICATIONS

Felemban et al., RFID for Oil and Gas Industry: Applications and Challenges, International Journal of Engineering and Innovative Technology (IJEIT), vol. 3, No. 5, Nov. 2013, pp. 80-85.

(Continued)

*Primary Examiner* — Robert E Fuller
(74) *Attorney, Agent, or Firm* — Kilpatrick Townsend & Sotckton LLP

(57) ABSTRACT

A system may include a bearing cylinder that has a bored hole for receiving a drive shaft. The bored hole can correspond to an eccentric inner diameter of the bearing cylinder. A radio frequency identification (RFID) tag may be positioned on a piston that may be slideably coupled to a housing of a bottom hole assembly. A motor may be positioned within the housing of the bottom hole assembly to rotate the bearing cylinder and position the drive shaft at a bend angle. An RFID reader may be coupled to the housing of the bottom hole assembly to detect the RFID tag in response to the RFID tag being in a detectable range of the RFID reader and to transmit information about the RFID tag to control the motor.

20 Claims, 4 Drawing Sheets

(51) Int. Cl.
   *E21B 47/12*     (2012.01)
   *G06K 19/07*     (2006.01)
   *G06K 7/10*      (2006.01)

(56)           References Cited

U.S. PATENT DOCUMENTS

| | | | |
|---|---|---|---|
| 5,941,321 | A  | 8/1999  | Hughes et al. |
| 6,003,606 | A  | 12/1999 | Moore et al. |
| 6,047,784 | A  | 4/2000  | Dorel et al. |
| 6,554,083 | B1 | 4/2003  | Kerstetter et al. |
| 6,742,604 | B2 | 6/2004  | Brazil et al. |
| 7,360,609 | B1 | 4/2008  | Falgout et al. |
| 7,373,995 | B2 | 5/2008  | Hughes et al. |
| 7,555,391 | B2 | 6/2009  | Gleitman et al. |
| 7,874,351 | B2 | 1/2011  | Hampton et al. |
| 8,011,448 | B2 | 9/2011  | Tulloch et al. |
| 8,016,036 | B2 | 9/2011  | Kirkwood et al. |
| 8,276,689 | B2 | 10/2012 | Giroux et al. |
| 8,376,065 | B2 | 2/2013  | Teodorescu et al. |
| 8,434,567 | B2 | 5/2013  | Menezes et al. |
| 8,453,527 | B2 | 6/2013  | Soliman et al. |
| 8,463,664 | B2 | 6/2013  | Griggs et al. |
| 8,511,404 | B2 | 8/2013  | Rasheed |
| 8,540,035 | B2 | 9/2013  | Vreeland et al. |
| 8,800,687 | B2 | 8/2014  | Shepherd et al. |
| 2003/0051919 | A1 | 3/2003 | Moore et al. |
| 2004/0050590 | A1 | 3/2004 | Pirovolou et al. |
| 2008/0068209 | A1 | 3/2008 | Sugiyama et al. |
| 2009/0121895 | A1 | 5/2009 | Denny et al. |
| 2009/0223663 | A1 | 9/2009 | Snider et al. |
| 2009/0266544 | A1 | 10/2009 | Redlinger et al. |
| 2010/0032212 | A1 | 2/2010 | Van Steenwyk et al. |
| 2010/0065143 | A1 | 3/2010 | Johnson et al. |
| 2011/0155368 | A1 | 6/2011 | El-Khazindar et al. |
| 2012/0067594 | A1 | 3/2012 | Noske et al. |
| 2012/0075113 | A1 | 3/2012 | Loi et al. |
| 2012/0080228 | A1 | 4/2012 | Radford et al. |
| 2012/0126008 | A1 | 5/2012 | Binmore et al. |
| 2012/0132418 | A1 | 5/2012 | McClung et al. |
| 2012/0178653 | A1 | 7/2012 | McClung et al. |
| 2013/0027216 | A1 | 1/2013 | Jantz et al. |
| 2013/0192897 | A1 | 8/2013 | MacKenzie et al. |
| 2013/0220701 | A1 | 8/2013 | Crowley et al. |
| 2013/0239673 | A1 | 9/2013 | Garcia-Osuna et al. |
| 2013/0319764 | A1 | 12/2013 | Schaaf et al. |
| 2013/0319767 | A1 | 12/2013 | Wilson et al. |
| 2014/0111349 | A1 | 4/2014 | Roberson et al. |
| 2016/0258218 | A1* | 9/2016 | Lange ............... E21B 7/067 |

FOREIGN PATENT DOCUMENTS

WO     2013185005       12/2013
WO     WO2016/105387 A1 *  6/2016  ............... E21B 7/06

OTHER PUBLICATIONS

International Patent Application No. PCT/US2015/036296, International Search Report and Written Opinion, dated Dec. 15, 2015, 9 pages.

\* cited by examiner

US 9,834,993 B2

DRIVE SHAFT ACTUATION USING RADIO FREQUENCY IDENTIFICATION

CROSS-REFERENCE TO RELATED APPLICATIONS

This is a U.S. national phase under 35 U.S.C. 371 of International Patent Application No. PCT/US2015/036296, titled "Drive Shaft Actuation Using Radio Frequency Identification" and filed Jun. 17, 2015, the entirety of which is incorporated herein by reference.

TECHNICAL FIELD

The present disclosure relates generally to devices for use in well systems. More specifically, but not by way of limitation, this disclosure relates to improved directional drilling.

BACKGROUND

A well system (e.g., oil or gas wells for extracting fluids from a subterranean formation) can include a drill string for forming a wellbore. A drill string can be used to drill a directional (or deviated) wellbore that is not vertical in its entirety. Directional drilling can enhance production of a wellbore. In directional drilling, the direction of the drill bit can be controlled through a bottom hole assembly that orients the drill bit through either an external bend to the bottom hole assembly housing or through an internal bend of the drive shaft of the drill bit. Orienting the drill bit using an internal bend or tilt of the drive shaft can provide increased hole quality and minimize fatigue to a housing of the bottom hole assembly.

Rotary steerable systems can control the direction of the drill bit using an internal bend of the drive shaft by using complicated control systems that can increase operational, maintenance, and repair costs. Mud motors can also be used to control the direction of drilling. However, mud motors control the direction of the drilling through adjustment of the bend angle of the mud motor manually at the surface of the wellbore. Adjustment of the bend angle of the mud motor at the surface can lead to delays in the drilling operations, can reduce a hole quality, and can produce a curvature of the well that is larger or smaller than desired.

DETAILED DESCRIPTION

Figure 1:
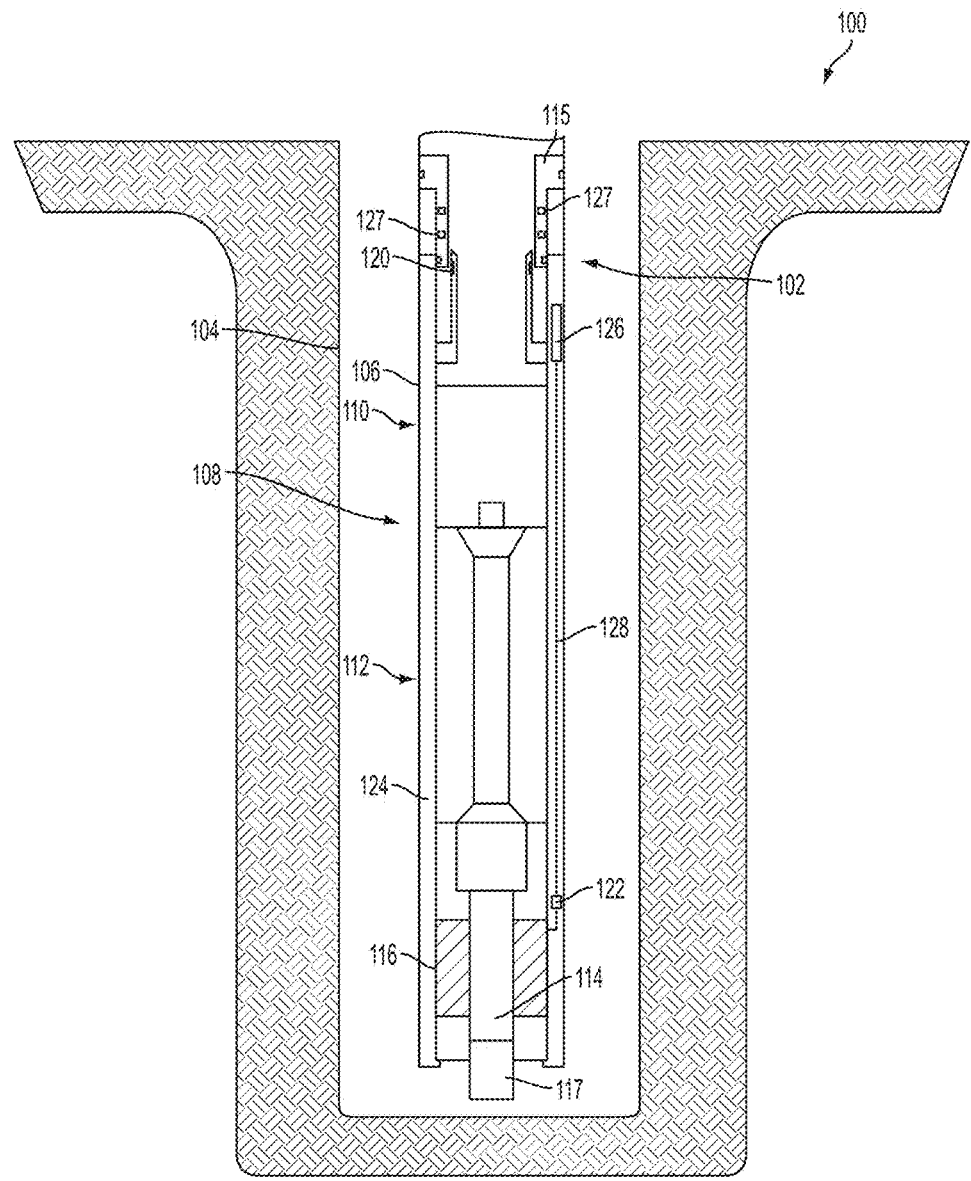
FIG. 1 is a schematic illustration of a well system that includes an RFID drive shaft actuation system according to one aspect of the present disclosure.

Certain aspects and examples of the disclosure are directed to an assembly for actuating an internal bend or tilt angle of a drive shaft of a bottom hole assembly using radio frequency identification ("RFID"). In directional drilling, using an internal bend (or tilting) of the drive shaft of a mud motor (or drilling motor) to control a drilling direction can provide improved hole quality and minimize fatigue to the bottom hole assembly housing.

An RFID drive shaft actuation system can allow for the angular position (or bend angle) of the drive shaft to be adjusted from the surface of the wellbore. Elements of the RFID drive shaft actuation system can be positioned on a housing of a bottom hole assembly and can include RFID tags that can have a specific signature or signal associated with a bend angle of the drive shaft. The RFID tags can be located on a piston that is slideably coupled to the inside of the housing of the bottom hole assembly. The piston can be supported by a spring that exerts a restoring force against the piston. An opposing force can be exerted against the piston in a direction opposite the restoring force of the spring. The differential force exerted on the piston (e.g., the difference between the opposing force and the restoring force of the spring) can determine the location of the piston along a length of the housing. The location of the piston along the length of the housing can determine which RFID tag, if any, located on the piston is in a detectable range of an RFID reader. The RFID reader can be positioned on the housing of the bottom hole assembly. The opposing force can be controlled (e.g., increased or decreased) at the surface of the wellbore. For example, the opposing force can be a force exerted by the drilling fluid (or mud) introduced from the surface into the housing of the bottom hole assembly. In some aspects, the opposing force can be an electro-magnetic force or a gravitational force.

The location of the piston, and the RFID tags located on the piston, can be controlled from the surface by increasing or decreasing the opposing force exerted on the piston. When the differential force is such that one of the RFID tags on the piston is located in a detectable range of the RFID reader the RFID tag can transmit its signature to the RFID reader. The signature can correspond to select bend angle (or bend setting) of the drive shaft. The RFID reader can receive the signature from the RFID tag and can transmit the signature to a computing device such as a signal processing module via a wired communication link. The signal processing module can determine the select bend angle associated with the signature and output a command to a motor to position the drive shaft at the select bend angle. The motor can be coupled to a gear that mates with an outer surface of a bearing cylinder. The bearing cylinder can have an eccentric inner diameter that is offset from an outer diameter of the bearing cylinder. The drive shaft can be positioned within a bored hole of the bearing cylinder that corresponds to the eccentric inner diameter. The rotational position of the bearing cylinder can determine the bend angle of the drive shaft. The motor can position the eccentric bearing cylinder such that the drive shaft is positioned at the select bend angle associated with the signature of the RFID tag in the detectable range of the RFID reader.

FIG. 1 depicts a cross-sectional side view of one embodiment of a system 100 that can include an RFID drive shaft actuation system 102. The RFID drive actuation system 102 can be positioned in a wellbore 104 that extends through various earth strata through a hydrocarbon bearing subterranean formation. A drill string 106 for directional drilling can be positioned in the wellbore 104. The drill string 106 can include a bottom hole assembly 108 having a power section 110, a coupling section 112, a drive shaft 114, a bearing assembly 116, and a drill bit 117. The bottom hole assembly 108 can determine the characteristics of the borehole, for example the borehole shape and direction. The drive shaft 114 can be positioned at a bend angle. The bend angle can control the angle of the drill bit 117 and the angle of the drilled hole. The drive shaft 114 can be positioned in a bored hole within the bearing assembly 116.

Some elements of the RFID drive shaft actuation system 102 can be positioned above the power section 110 of the bottom hole assembly 108 due to space limitation around the drilling motor drivetrain. Some elements of the RFID drive shaft actuation system 102 can be located elsewhere on the bottom hole assembly 108, for example at the coupling section 112. The system 102 can include an RFID reader or reader 120, a motor 122, a signal processing module 126, and more RFID tags 127 positioned on a piston 115.

The piston 115 can be slideably coupled to an inner surface of a housing 124 of the bottom hole assembly 108. In some aspects, the piston 115 can be coupled to a sleeve of the bottom hole assembly 108. The RFID reader 120 also can be positioned on the housing 124 of the bottom hole assembly 108. The RFID reader 120 can be in communication with a signal processing module 126 via a wired or wireless communication link. A wired communication link can include interfaces such as Ethernet, USB, IEEE 1394, or a fiber optic interface. A wireless communication link can include wireless interfaces such as IEEE 802.11, Bluetooth, or radio interfaces for accessing cellular telephone networks (e.g., transceiver/antenna for accessing a CDMA, GSM, UMTS, or other mobile communications network). The signal processing module 126 can be positioned in a cavity of the housing 124, on an inner or an outer surface of the housing 124, or other suitable locations on the bottom hole assembly 108. In some aspects, the signal processing module 126 can be positioned away from the bottom hole assembly 108, for example but not limited to, at the surface of the wellbore or on a tool positionable within the wellbore. The signal processing module 126 can be in communication with the motor 122 via a wired communication link 128. In some aspects, a wireless communication link can be used instead of the wired communication link 128.

A restoring force can be exerted by a spring supporting the piston 115. An opposing force can act on the piston 115 to cause the piston 115 to slide within the housing 124 against the restoring force of the spring 144. For example, the opposing force can be from the pressure of the drilling fluid, a gravitational force acting on a weight attached to an end of the piston 115, or an electro-magnetic force. The opposing force can cause the piston 115 to slide within the housing 124 to compress the spring and move an RFID tag 127 on the piston 115 within a detectable range of the RFID reader 120. The RFID reader 120 can receive a signature (or a signal) from the RFID tag 127 when the RFID tag 127 is in the detectable range. For example, the signature can be associated with a select bend angle of the drive shaft 114. The RFID reader 120 can transmit the signature received from one of the RFID tags 127 to the signal processing module 126 via the communication link. More than one RFID tag may be positioned on the piston 115 and each RFID tag may contain a different bend setting of the drive shaft 114. The RFID reader 120 can receive the signature from the RFID tag 127 that is in the detectable range. The RFID tags 127 can be positioned such that only one RFID tag 127 may be in the detectable range of the RFID reader 120 at a given time. In other aspects, RFID tags can be positioned such that a certain number of RFID tags are in the detectable range of the RFID reader 120 at a given time.

The signal processing module 126 can determine the select bend angle or other information corresponding to the signature. The signal processing module 126 can transmit a command to a motor 122 to position the drive shaft 114 at a bend angle corresponding to the select bend angle associated with the RFID tag 127. The motor 122 can rotate the bearing assembly 116 to a specific position associated with the select bend angle of the drive shaft 114. In some aspects, the information stored on the RFID tag 127 can be a rotational position of the bearing assembly 116.

Figure 2A:
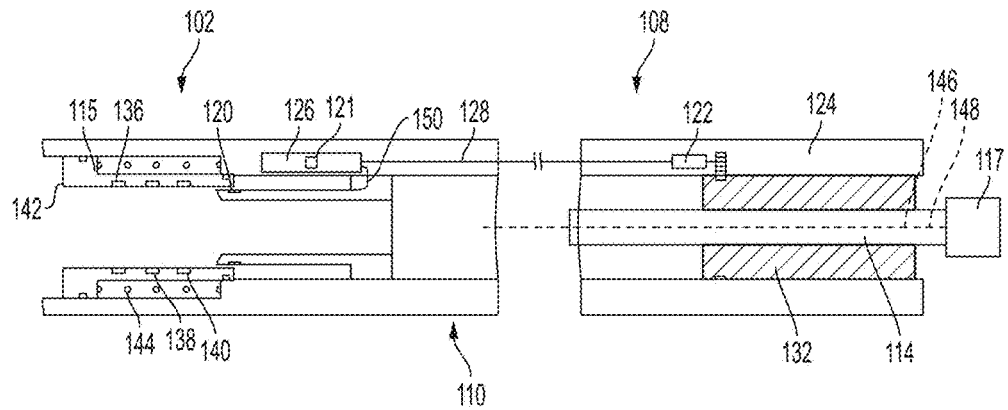
FIG. 2A is a cross-sectional side view of the RFID drive shaft actuation system according to one aspect of the present disclosure.

FIG. 2A depicts a cross-sectional side view of an RFID drive shaft actuation system 102 for controlling a bend angle of a drive shaft 114 of a bottom hole assembly 108 according to one aspect. The drive shaft 114 is positioned within a bored hole of a bearing cylinder 132 of the bearing assembly 116. The drive shaft 114 controls the position of the drill bit 117. The bored hole of the bearing cylinder 132 can define an inner diameter of the bearing cylinder 132. The inner diameter of the bearing cylinder 132 can be eccentric. The inner diameter of the bearing cylinder 132 can define an inner axis 146. The outer diameter of the bearing cylinder 132 can have an axis that is aligned with a center axis 148 of the housing 124. The inner axis 146 off the bearing cylinder 132 can be offset from the axis of the outer diameter (and the center axis 148).

The RFID drive shaft actuation assembly 102 can include the piston 115 slideably positioned within the housing 124 of the bottom hole assembly 108. Three RFID tags 136, 138, 140 are depicted as positioned on the piston 115. Only three RFID tags are discussed herein to simplify illustration, but more or fewer RFID tags may be used in this or other embodiments described below in place of or in addition to RFID tags 136, 138, 140. Each RFID tag can include information, for example a select bend angle, signature, or command to tilt the drive shaft 114 to a specific bend angle. The number of RFID tags positioned on the piston 115 can determine the increments of the bend angle of the drive shaft 114 that may be selected. For example, the RFID tags 136, 138, 140 can be positioned in rings around the piston 115, in a spiral around the piston 115, and/or mounted to the piston 115 in other suitable positions. The RFID tags 136, 138, 140 can be positioned relative to one another so as to prevent signal interference between each RFID tag. The signal strength and interference of each RFID tag 136, 138, 140 can depend on the transmitted power, frequency, the RFID tag orientation, and the surrounding environment.

The RFID tags 136, 138, 140 can be passive tags that do not require their own internal power source. A passive tag can use the radio energy transmitted by the RFID reader 120 to power the tag and transmit the information stored on the tag (e.g. the signature) to the RFID reader 120 when the tag is in the detectable range. For example, the RFID reader 120 can continuously transmit radio waves or a signal that can be converted by an antenna of the passive tag into electricity that can power a microchip in the passive tag. In some aspects, the microchip can change the load on the antenna of the passive tag to transmit (or reflect back) to the RFID reader 120 an altered signal. The altered signal can correspond to the information stored on the passive tag. A characteristic of the altered signal can be associated with the signature of the passive tag. The characteristic of the altered signal can include, for example a specific magnetic field, a specific wave form, or a specific mode that is associated with the passive tag.

In some aspects, the RFID tags 136, 138, 140 can be active tags, or a combination of active and passive tags. For example, an active tag on the piston 115 can include a signature associated with a first position of the bearing cylinder 132 while a passive tag positioned on the piston 115 can include a signature associated with a second position of the bearing cylinder 132. For example, the first position of the bearing cylinder 132 can align the inner axis 146 of the bearing cylinder 132 and the center axis 148 of the housing 124 and the second position can angle the inner axis 146 away from the center axis 148 to define a bend angle of the bearing cylinder 132. An active tag can include a battery and can periodically transmit its identification signal when in the presence of the RFID reader 120. Active tags can be more expensive than passive tags. In some aspects, passive tags can have a smaller detectable range associated with the RFID reader 120 than the active tags.

In some aspects, the RFID reader 120 can be passive and can receive radio signals from passive RFID tags or active RFID tags as opposed to transmitting a signal to interrogate an RFID tag. The RFID reader 120 can be located at a single point on the housing 124, can be located at multiple points on the housing 124, or can be a partial or complete circular sleeve attached to the housing 124.

The piston 115 is supported by a spring 144. The piston 115 can slide inside the housing 124 against a restoring force of the spring 144 due to an opposing force acting on the end 142 of the piston 115. The spring 144 can be a compression spring. The spring 144 has a specific spring stiffness that is known and the force required to move the piston 115 a certain distance along a length of the housing 124 can be represented by the relationship F=kx, where F is the spring force, k is the spring stiffness, and x is the distance the spring 144 is compressed. The distance x the spring is compressed can be determined and the position of the spring 144 relative to the housing 124 can be determined. The position of the piston 115 and each of the RFID tags 136, 138, 140 can be determined in relation to the RFID reader 120 on the housing 124 based on the position of the spring 144 relative to the housing 124.

The position of the piston 115 and the RFID tags 136, 138, 140 can be controlled from the surface by adjusting the opposing force exerted on the end 142 of the piston 115. In some aspects, the opposing force can be from the drilling fluid (or mud) introduced into the housing from the surface. The opposing force of the drilling fluid can be controlled by a pump located at the surface. In some aspects, the drilling fluid introduced downhole can include magnetized drilling fluid that can change a magnetic field, the magnetic field can act on the piston 115 and cause it to slide within the housing 124. The strength of the magnetic field can be altered by adjusting the magnetization of the drilling fluid prior to its injection downhole. In some aspects, the piston 115 can include a weight positioned at the end 142 of the piston 115. The force exerted on the spring 144 by the weight of the piston 115 can be dependent on the inclination of the bottom hole assembly 108. For example, the full force of the weight of the piston 115 can be applied to the spring 144 when drilling downwards in a vertical drilling. In some aspects, the weight of the piston 115 is not acting on the spring 144 during horizontal drilling.

The opposing force applied to the end 142 of the piston 115 can be increased or decreased such that at least one of the RFID tags 136, 138, 140 is moved into a detectable range of the RFID reader 120. The RFID tags 136, 138, 140 can each transmit a signature to the RFID reader 120 when in a detectable range, the signature can be associated with a select bend angle of the drive shaft 114. The RFID reader 120 can transmit the signature it received from the RFID tag to the signal processing module 126 via a wired communication link 150. The signal processing module 126 can receive power from a power source, such as a battery 121. The signal processing module 126 can process the signature and determine the select bend angle associated with the signature. The signal processing module 126 can output one or more instructions to the motor 122 to position the bearing cylinder 132 in a position that sets the drive shaft 114 at the select bend angle associated with the signature of the RFID tag in the detectable range of the RFID reader 120. The signal processing module 126 can output the one or more instructions to the motor 122 via the wired communication link 128. The signal processing module 126 can be calibrated to determine the select bend angle associated with the signature of each RFID tag 136, 138, 140. The signature of each RFID tag 136, 138, 140 can be a specific voltage change, current change, or other suitable signature identifiable by the signal processing module 126.

Figure 2B:
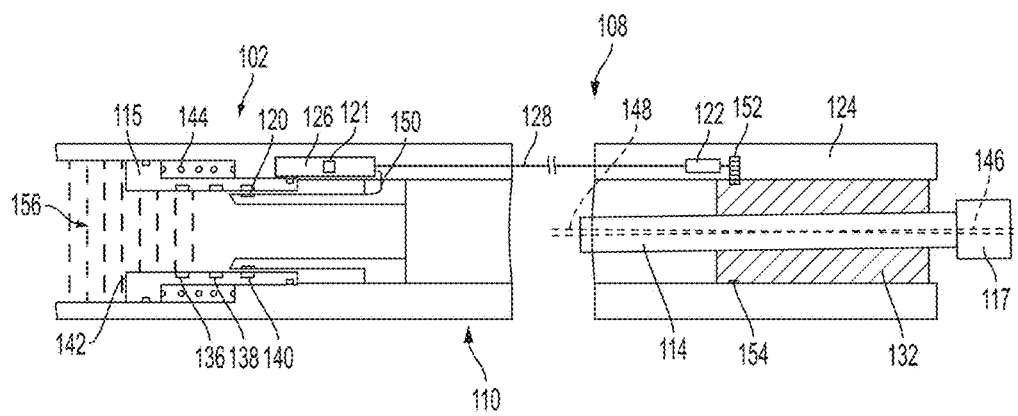
FIG. 2B is a cross-sectional side view of the RFID drive shaft actuation system of FIG. 2A with a first RFID tag in a detectable range according to one aspect of the present disclosure.
Figure 2C:
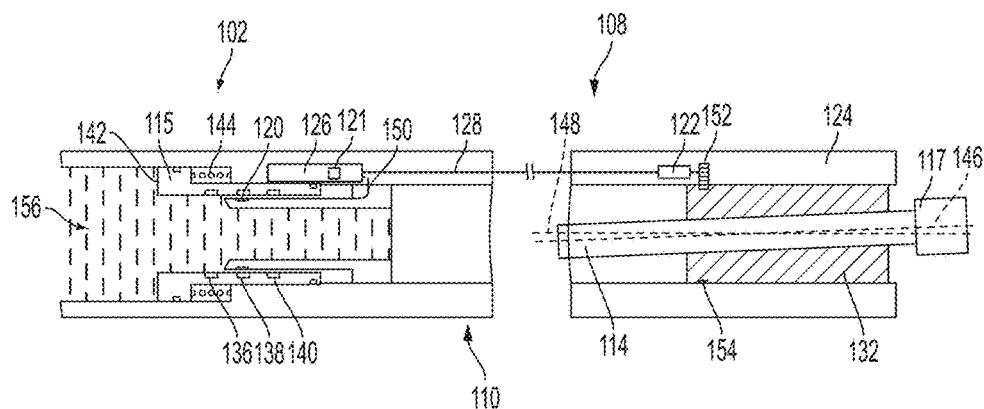
FIG. 2C is a cross-sectional side view of the RFID drive shaft actuation system of FIG. 2A with a second RFID tag in a detectable range according to one aspect of the present disclosure.

In FIG. 2A the RFID tags 136, 138, 140 are shown out of the detectable range of the RFID reader 120 positioned on a sleeve of the housing 124. FIG. 2B depicts the RFID drive shaft actuation system 102 of FIG. 2A with the drive shaft 114 and the housing 124 in a first position. Specifically, the piston 115 is positioned such that the RFID tag 140 is located in the detectable range of the RFID reader 120 and the drive shaft 114 is positioned at the select bend angle associated with the RFID tag 140. FIG. 2C depicts the RFID drive shaft actuation system 102 with the drive shaft 114 and the housing 124 in a second position associated with the RFID tag 138. Specifically, the piston 115 is positioned such that RFID tag 138 is located in the detectable range of the RFID reader 120 and the drive shaft 114 is positioned at the select bend angle associated with the RFID tag 138.

As depicted in FIG. 2B, the RFID tag 140 can transmit its signature to the RFID reader 120. The RFID reader 120 can transmit the signature it received from the RFID tag 140 to the signal processing module 126 via the wired communication link 150. In some aspects, after receiving the signature from the RFID reader 120, the signal processing module 126 can transmit a notification via a wired or wireless communication link to a computing device at the surface, The notification can be transmitted using, for example but not limited to signal telemetry, electro-magnetic telemetry, acoustic telemetry, mud-pulse telemetry, or wired pipe. The notification can include the information (e.g., the select bend angle) associated with the RFID tag 140.

The signal processing module 126 can determine the signature received from the RFID reader 120 (the signature associated with the RFID tag 140) and can transmit a command to the motor 122 via the wired communication link 128. The command can be an instruction to position the drive shaft 114 at a bend angle corresponding to the select bend angle of the RFID tag 140. The inner axis 146 of the bearing cylinder 132 as compared to the center axis 148 of the housing 124 can define the bend angle of the drive shaft 114.

The motor 122 can position the drive shaft 114 at the select bend angle by rotating a gear 152 configured to mate with an outside surface 154 of the bearing cylinder 132. As the bearing cylinder 132 rotates the bend angle of the drive shaft 114 can change. The gear 152 can rotate the bearing cylinder 132 to a rotation position that positions the drive shaft 114 at the select bend angle. In some aspects, when the bearing cylinder 132 is positioned such that the drive shaft 114 is at the select bend angle associated with the RFID tag in the detectable range, a locking mechanism can secure the bearing cylinder 132 in place. In some aspects, a locking mechanism can secure the gear 152 in position which can thereby secure the bearing cylinder 132 in place.

The signal processing module 126 can receive power from the battery 121. In some aspects, the power source can be a thermal generator, a fluid generator, a thermo-electric generator, a power supply located on a tool positioned within the bottom hole assembly, a power supply located on an add-on sub assembly, or a power supply located on a measurement while drilling system attached to the bottom housing assembly, or other suitable power source. The signal processing module 126 can also provide power to the RFID reader 120 via a pass-through wire connection between the RFID reader 120 and the signal processing module 126. In some aspects, the wired communication link 150 can also be the pass through wire connection for providing power to the RFID reader 120. When the RFID reader 120 receives less power the discoverable range of the RFID tags 136, 138, 140 can be decreased. The lower the amount of power the RFID reader 120 draws from the power source the longer the utility of the power source (e.g., length of the battery life). In some aspects, the power source could provide a greater amount of power, which can increase the detectable range of the RFID tags 136, 138, 140 and the accuracy of the RFID reader 120.

The motor 122 can also receive power via a wired connection passing between the motor 122 and the signal processing module 126 through the housing 124 of the bottom hole assembly 108. In some aspects, the wired connection can be the wired communication link 128. The RFID reader 120, piston 115, and signal processing module 126 are shown in FIGS. 2A-2C positioned above the power section 110 of the bottom hole assembly 108. The wired communication link 128 between the signal processing module 126 and the motor 122 can extend from the signal processing module 126 located above the power section 110, through the power section 110 and the coupling section 112 (depicted in FIG. 1), terminating at the motor 122 positioned at the bearing cylinder 132. The difference between the bend angles of the drive shaft 114 can be small and the radial clearance of the housing 124 can be minimized to allow RFID reader 120, piston 115, and signal processing module 126 to be positioned directly above the bearing cylinder 132 at the coupling section 112 (depicted in FIG. 1). When the signal processing module 126 is positioned directly above the bearing assembly 116 the wired communication link 128 between the signal processing module 126 and the motor 122 can extend a shorter distance through the housing 124 as compared to when the signal processing module 126 is positioned above the power section 110.

Figure 3:
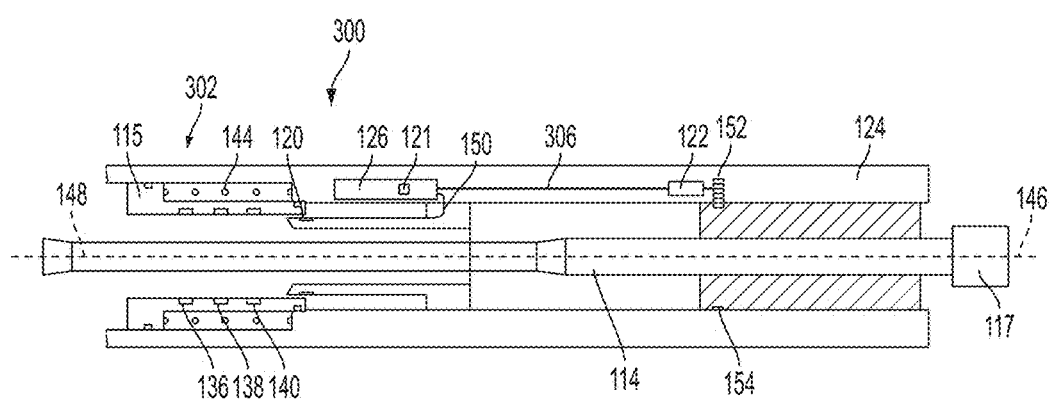
FIG. 3 is a cross-sectional side view of an RFID drive shaft actuation system according to another aspect of the present disclosure.

FIG. 3 depicts a cross-sectional side view of an RFID drive shaft actuation system 300 according to an additional aspect of the disclosure. Various elements of the system 300 are positioned at a different portion of a bottom hole assembly than those same elements, identified with the same numerals, in the system 102 depicted in FIGS. 1-2C. Specifically, the system 300 depicts certain elements of the system positioned in a coupling section 302 of a bottom hole assembly 304 as opposed to above a power section of the bottom hole assembly 304 (as depicted in FIGS. 1-2C). As depicted in FIG. 3, the RFID reader 120, the piston 115, the RFID tags 136, 138, 140, the wired communication link 150, and the signal processing module 126 can be positioned in the coupling section 302 of the bottom hole assembly 304. By positioning the signal processing module 126 at the coupling section 302 the signal processing module 126 can be positioned closer to the motor 122. A wired communication link 306 can extend between the signal processing module 126 and the motor 122. The wired communication link 306 can function in the same way as the wired communication link 128 described with respect to FIGS. 1-2C. The wired communication link 306 can extend a shorter distance than the wired communication link 128 depicted in the system 102 of FIGS. 1-2C. In some aspects, the shorter distance between the signal processing module 126 and the motor 122 can decrease the chances of damaging the wired communication link 128 and can provide for easier installation of the system 300. The elements of the system 300, including but not limited to, the RFID reader 120, the piston 115, the RFID tags 136, 138, 140, the wired communication link 150, and the signal processing module 126, can function as described above with respect to FIGS. 1-2C. Other elements of the system 300 labelled with the same numerals as those used in FIGS. 1-2C can be considered the same element referenced in FIGS. 1-2C.

Figure 4:
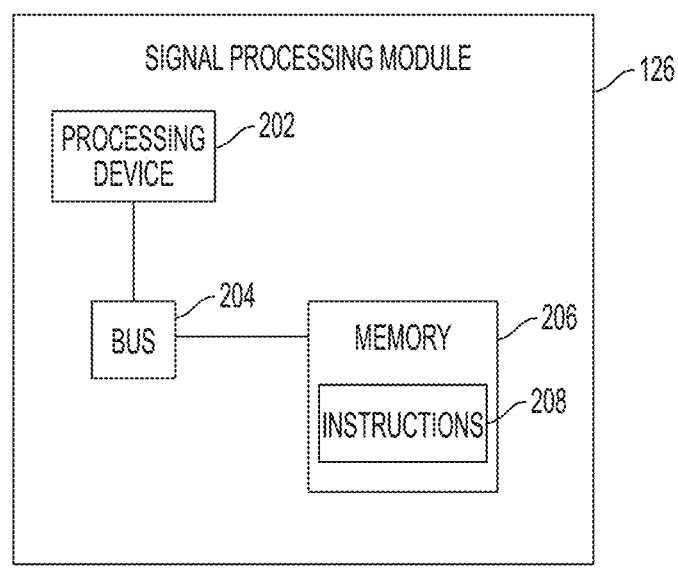
FIG. 4 is a block diagram depicting an example of a signal processing module according to one aspect of the present disclosure.

FIG. 4 is a block diagram depicting an example of a signal processing module 126 according to one aspect of the present disclosure. The signal processing module 126 includes a processing device 202, a memory device 206, and a bus 204. The processing device 202 can execute one or more operations for determining a select bend angle associated with a signal and transmitting instructions to a motor. The processing device 202 can execute instructions 208 stored in the memory device 206 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessor, etc.

The processing device 202 can be communicatively coupled to the memory device 206 via the bus 204. The non-volatile memory device 206 may include any type of memory device that retains stored information when powered off. Non-limiting examples of the memory device 206 include EEPROM, flash memory, or any other type of non-volatile memory. In some aspects, at least some of the memory device 206 can include a medium from which the processing device 202 can read the instructions 208. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc.

Example #1

A system may include a bearing cylinder that has a bored hole for receiving a drive shaft. The bored hole can correspond to an eccentric inner diameter of the bearing cylinder. A radio frequency identification (RFID) tag may be positioned on a piston that may be slideably coupled to a housing of a bottom hole assembly. A motor may be positioned within the housing of the bottom hole assembly to rotate the bearing cylinder and position the drive shaft at a bend angle. An RFID reader may be coupled to the housing of the bottom hole assembly to detect the RFID tag in response to the RFID tag being in a detectable range of the RFID reader and to transmit information about the RFID tag to control the motor.

Example #2

The system of Example #1 may have the motor coupled to a gear. The gear may be positioned to mate with an outer surface of the bearing cylinder.

Example #3

The system of any of Examples #1-2 may also include a signal processing module coupled to the RFID reader. The signal processing module may have a non-transitory, computer-readable medium that includes instructions. The instructions may be executable for causing the signal processing module to receive the information about the RFID tag from the RFID reader. The instructions may also cause the signal processing module to determine a select bend angle associated with the information about the RFID tag and transmit a command to the motor to rotate the bearing cylinder and position the drive shaft at the select bend angle.

Example #4

The system of any of Examples #1-3 may include a spring that supports the piston. The spring may exert a restoring force on the piston.

Example #5

The system of any of Examples #1-4 may have the piston be slideable in response to a differential force. The differential force may be based on the restoring force of the spring and an opposing force.

Example #6

The system of any of Examples #1-5 may include a power source for providing power to a signal processing module. The signal processing module may be communicatively coupled to the RFID reader.

Example #7

An assembly may include a bearing cylinder positioned within a housing of a bottom hole assembly. The bearing cylinder may include a bored hole that corresponds to an eccentric inner diameter of the bearing cylinder. A piston may be slideably coupled to the housing of the bottom hole assembly. The piston may include a radio frequency identification (RFID) tag to transmit information to an RFID reader. The information may include a select bend angle of a drive shaft positioned within the bore hole. A spring may exert a restoring force on the piston. A motor may be coupled to the bearing cylinder to rotate the bearing cylinder in response to receiving command from a signal processing module. The signal processing module may be coupled to the RFID reader to determine the select bend angle.

Example #8

The assembly of Example #7 may include a gear coupled to the motor. The motor may be positioned to mate with an outside surface of the bearing cylinder.

Example #9

The assembly of any of Examples #7-8 may include a power source for providing power to the signal processing module.

Example #10

The assembly of any of Examples #7-9 may include an additional RFID tag disposed on the piston for transmitting additional information to the RFID reader.

Example #11

The assembly of any of Examples #7-10 may feature the bearing cylinder having an outer diameter that includes an axis that is aligned with a central axis of the housing of the bottom hole assembly.

Example #12

The assembly of any of Examples #7-12 may feature the piston being slideable in response to a differential force. The differential force may be based on the restoring force of the spring and an opposing force.

Example #13

A method may include transmitting, by a radio frequency identification (RFID) tag, information about the RFID tag. An RFID reader may receive the information about the RFID tag in response to the RFID tag being in a detectable range of the RFID reader. A signal processing module may determine a select bend angle associated with the information. The signal processing module may also generate a command to rotate a bearing cylinder to position a drive shaft at the select bend angle.

Example #14

The method of Example #13 may also include transmitting to a motor, by a communication link, the command to rotate the bearing cylinder to position the drive shaft at the select bend angle.

Example #15

The method of any of Examples #13-14 may also include transmitting, by a communication link, the information about the RFID tag from the RFID reader to the signal processing module.

Example #16

The method of any of Examples #13-15 may also include rotating, by a gear positioned to mate with a surface of the bearing cylinder, the bearing cylinder to position the drive shaft at the select bend angle.

Example #17

The method of any of Examples #13-15 may also include positioning the RFID tag in the detectable range of the RFID reader.

Example #18

The method of any of Examples #13-17 may also include positioning the RFID tag in the detectable range of the RFID reader by exerting a force on a piston coupled to a housing of a bottom hole assembly. In addition, the RFID tag may be disposed on the piston.

Example #19

The method of Example #18 may include exerting the force on the piston coupled the housing of the bottom hole assembly by injecting drilling fluid from a surface.

Example #20

The method of any of Examples #13-17 may also include moving a piston coupled to a housing of a bottom hole assembly by injecting drilling fluid from a surface. In addition, the RFID tag may be disposed on the piston.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a bearing cylinder including a bored hole for receiving a drive shaft, the bored hole corresponding to an eccentric inner diameter of the bearing cylinder;
   a radio frequency identification (RFID) tag positioned on a piston that is slideably coupled to a housing of a bottom hole assembly;
   a motor positioned within the housing of the bottom hole assembly to rotate the bearing cylinder and position the drive shaft at a bend angle; and
   an RFID reader coupled to the housing of the bottom hole assembly to detect the RFID tag in response to the RFID tag being in a detectable range of the RFID reader and to transmit information about the RFID tag to control the motor.

2. The system of claim 1, wherein the motor is coupled to a gear positioned to mate with an outer surface of the bearing cylinder.

3. The system of claim 1, further comprising:
   a signal processing module coupled to the RFID reader, the signal processing module having a non-transitory, computer-readable medium that includes instructions that are executable for causing the signal processing module to:
      receive the information about the RFID tag from the RFID reader;
      determine a select bend angle associated with the information about the RFID tag; and
      transmit a command to the motor to rotate the bearing cylinder and position the drive shaft at the select bend angle.

4. The system of claim 1, wherein the piston is supported by a spring that exerts a restoring force on the piston.

5. The system of claim 4, wherein the piston is slideable in response to a differential force, the differential force being based on the restoring force of the spring and an opposing force.

6. The system of claim 1, further comprising:
   a power source for providing power to a signal processing module, the signal processing module being communicatively coupled to the RFID reader.

7. An assembly comprising:
   a bearing cylinder positioned within a housing of a bottom hole assembly, the bearing cylinder having a bored hole that corresponds to an eccentric inner diameter of the bearing cylinder;
   a piston slideably coupled to the housing of the bottom hole assembly, the piston including a radio frequency identification (RFID) tag to transmit information to an RFID reader, the information including a select bend angle of a drive shaft positioned within the bored hole;
   a spring to exert a restoring force on the piston;
   a motor coupled to the bearing cylinder to rotate the bearing cylinder in response to receiving a command from a signal processing module coupled to the RFID reader to determine the select bend angle.

8. The assembly of claim 7, wherein the motor is coupled to a gear positioned to mate with an outside surface of the bearing cylinder.

9. The assembly of claim 7, further comprising:
   a power source for providing power to the signal processing module.

10. The assembly of claim 7, further comprising:
    an additional RFID tag disposed on the piston for transmitting additional information to the RFID reader.

11. The assembly of claim 7, wherein the bearing cylinder includes an outer diameter that has an axis that is aligned with a central axis of the housing of the bottom hole assembly.

12. The assembly of claim 7, wherein the piston is slideable in response to a differential force, the differential force being based on the restoring force of the spring and an opposing force.

13. A method comprising:
    transmitting, by a radio frequency identification (RFID) tag, information about the RFID tag;
    receiving, by an RFID reader, the information about the RFID tag in response to the RFID tag being in a detectable range of the RFID reader;
    determining, by a signal processing module, a select bend angle associated with the information; and
    generating, by the signal processing module, a command to rotate a bearing cylinder to position a drive shaft at the select bend angle.

14. The method of claim 13, further comprising:
    transmitting, by a communication link, to a motor the command to rotate the bearing cylinder to position the drive shaft at the select bend angle.

15. The method of claim 13, further comprising:
    transmitting, by a communication link, the information about the RFID tag from the RFID reader to the signal processing module.

16. The method of claim 13, further comprising:
rotating, by a gear positioned to mate with a surface of the bearing cylinder, the bearing cylinder to position the drive shaft at the select bend angle.

17. The method of claim 13, further comprising:
positioning the RFID tag in the detectable range of the RFID reader.

18. The method of claim 17, wherein positioning the RFID tag in the detectable range of the RFID reader comprises exerting a force on a piston coupled to a housing of a bottom hole assembly, wherein the RFID tag is disposed on the piston.

19. The method of claim 18, wherein exerting the force on the piston coupled to the housing of the bottom hole assembly comprises injecting drilling fluid from a surface.

20. The method of claim 13, further comprising moving a piston coupled to a housing of a bottom hole assembly by injecting drilling fluid from a surface, wherein the RFID tag is disposed on the piston.

* * * * *